UNITED STATES PATENT OFFICE.

FRITZ BENDER, OF MÜHLHEIM, HESSE, GERMANY, ASSIGNOR TO A. LEONHARDT & CO., OF SAME PLACE.

YELLOW COLORING-MATTER.

SPECIFICATION forming part of Letters Patent No. 350,229, dated October 5, 1886.

Application filed July 27, 1886. Serial No. 209,206. (No specimens.)

*To all whom it may concern:*

Be it known that I, FRITZ BENDER, a subject of the Emperor of Germany, residing at Mühlheim, in the Grand Duchy of Hesse, Germany, have invented a new and useful Improvement in Yellow Coloring-Matters, of which the following a specification.

Paranitrotoluol is converted into its mono-sulpho compound by being heated with fuming sulphuric acid, and the sodium salt thereof, by being treated with caustic soda-lye, is transferred into a red condensation product. The latter, by reducing it in an alkaline or acidulous solution, is converted into a new amido-sulpho acid hardly soluble in water and in alcohol, the principal characteristics of which are that its diazo-derivates, in combination with aromatic amines and phenoles, and also with the sulpho and carbon compounds of them, form dye-stuffs which can be fixed on cotton without mordant, and will stand soaping.

As an example of the manner in which a yellow coloring-matter may be prepared, I proceed as follows: Thirty kilos of the sodium salt of the new amido-sulpho acid are dissolved in water and diazotized by means of ten kilos nitrite and thirty-five kilos of concentrated hydrochloric acid. The diazo body precipitates in cooling, and after some standing is brought into reaction with an alkaline solution of about fifteen to twenty kilos of a mixture of phenol or its carbon acids—for instance, salicylic acid. The new coloring-matter is produced immediately and is precipitated by means of salt. According to the shade to be obtained, more or less of the one or the other of the two compounds of said mixture is employed. By increasing the amount of phenol a more brilliant color is obtained. By allowing the phenol carbon acids to prevail the color becomes more reddish and dark. By dipensing with the one or the other of said two components the extremes of said shades are obtained.

Having thus described my invention and the manner of employing the same, what I claim, and wish to have secured by Letters Patent of the United States of America, is—

1. The production of a yellow coloring-matter by treating the soda salt of a paranitro toluol sulpho acid by caustic soda-lye, reducing the so-obtained red product of condensation into a hardly-soluble amido-sulpho acid, diazotizing the latter, and combining the diazo product with a mixture of phenol and its carbon acids, or only with the one or the other component of said mixture in an alkaline solution.

2. The yellow coloring-matter herein described, having the properties to be a brown powder which dissolves easily in cold water with an orange color, the solution being colored red by ammonia or soda-lye and precipitated with a black-blue color by hydrochloric acid, the said coloring-matter having, further, the property of being soluble in concentrated sulphuric acid with a brilliant violet color, and to be fixed on cotton, without any mordant, with a brilliant yellow shade.

In testimony whereof I have signed my name to this specification in the presence of two subscribing witnesses.

FRITZ BENDER.

Witnesses:
 FRANZ WIRTH,
 JOSEPH PATRICK.